United States Patent
Burch

(10) Patent No.: US 6,582,006 B1
(45) Date of Patent: Jun. 24, 2003

(54) TRUCK BED TRUNK COVER

(76) Inventor: Kelly Burch, 501 N. Garrett, Elk City, OK (US) 73644

( * ) Notice: Subject to any disclaimer, the term of this patent is extended or adjusted under 35 U.S.C. 154(b) by 0 days.

(21) Appl. No.: 10/226,897

(22) Filed: Aug. 23, 2002

Related U.S. Application Data

(63) Continuation-in-part of application No. 10/143,658, filed on May 10, 2002.

(51) Int. Cl.⁷ .................................................. B60P 7/02
(52) U.S. Cl. ............................ 296/100.06; 296/100.07; 296/100.08; 296/100.09
(58) Field of Search .......................... 296/100.06, 37.6, 296/571, 39.2, 100.02, 26.1, 37.1, 100.07, 100.09, 24.1; 224/404, 403, 542, 402; 414/462

(56) References Cited

U.S. PATENT DOCUMENTS

| | | | | |
|---|---|---|---|---|
| 3,704,039 A | * | 11/1972 | Dean ...................... | 296/100.07 |
| 3,762,762 A | * | 10/1973 | Beveridge et al. ...... | 296/100.07 |
| 3,923,334 A | * | 12/1975 | Key ....................... | 296/100.07 |
| 3,954,296 A | * | 5/1976 | Patnode ................. | 296/10 |
| 4,533,171 A | * | 8/1985 | Lake ..................... | 296/10 |
| 4,620,743 A | * | 11/1986 | Eke ....................... | 296/146.8 |
| 4,626,024 A | * | 12/1986 | Swann ................... | 296/216.03 |
| 4,993,771 A | | 2/1991 | Ingerson | |
| 5,017,777 A | * | 5/1991 | Ishizuka et al. ........ | 250/231.16 |
| 5,127,701 A | * | 7/1992 | Miller .................... | 296/100.06 |
| 5,340,188 A | * | 8/1994 | Goble ................... | 296/100.06 |
| D366,448 S | | 1/1996 | Ney | |
| 5,503,450 A | * | 4/1996 | Miller ................... | 296/100.08 |
| 5,564,768 A | | 10/1996 | Saffold | |
| 5,632,522 A | * | 5/1997 | Gaitan et al. .......... | 296/100.06 |
| 5,758,679 A | * | 6/1998 | Tamburelli ............. | 135/88.09 |
| 5,924,761 A | * | 7/1999 | Harrison ................ | 296/26.02 |
| 5,951,095 A | * | 9/1999 | Herndon ................ | 296/100.09 |
| 5,957,525 A | * | 9/1999 | Nelson .................. | 296/100.06 |
| 5,971,469 A | * | 10/1999 | Lund et al. ............ | 296/100.06 |
| 5,988,728 A | * | 11/1999 | Lund et al. ............ | 296/100.08 |
| 6,000,740 A | | 12/1999 | Hall | |
| 6,041,548 A | * | 3/2000 | Miller .................... | 49/345 |
| 6,102,474 A | | 8/2000 | Daley | |
| 6,174,012 B1 | | 1/2001 | Saffold | |
| 6,212,827 B1 | * | 4/2001 | Miller .................... | 49/345 |
| 6,217,102 B1 | * | 4/2001 | Lathers ................. | 296/100.07 |
| 6,299,232 B1 | | 10/2001 | Davis | |
| 6,309,005 B1 | * | 10/2001 | Priest et al. ........... | 296/100.06 |
| 6,343,828 B1 | * | 2/2002 | Young et al. .......... | 296/100.06 |
| 6,361,097 B1 | * | 3/2002 | Lechkun ................ | 296/107.08 |
| 6,520,558 B1 | * | 2/2003 | Katterloher et al. ... | 296/100.06 |
| 2001/0038225 A1 | * | 11/2001 | Muirhead .............. | 296/100.06 |

* cited by examiner

Primary Examiner—Kiran Patel
(74) Attorney, Agent, or Firm—Randal D. Homburg

(57) ABSTRACT

The present invention relates to a trunk lid cover for the bed of a pickup, pivotally attaching to the bed of the pickup bed near the cab with piston lifters attaching the cover to the sides of the pickup to apply force pushing the cover upwards when lifted, the cover extending to the tailgate section of the pickup bed, replacing the tailgate. The cover engages the tailgate attaching mechanismk of the pickup to form a secure closure, with the vertical portion of the cover including a hinged license plate attachment under which a keyed or coded security lock is located, with running lights and accent lights which integrate with the electrical system of the pickup.

5 Claims, 6 Drawing Sheets

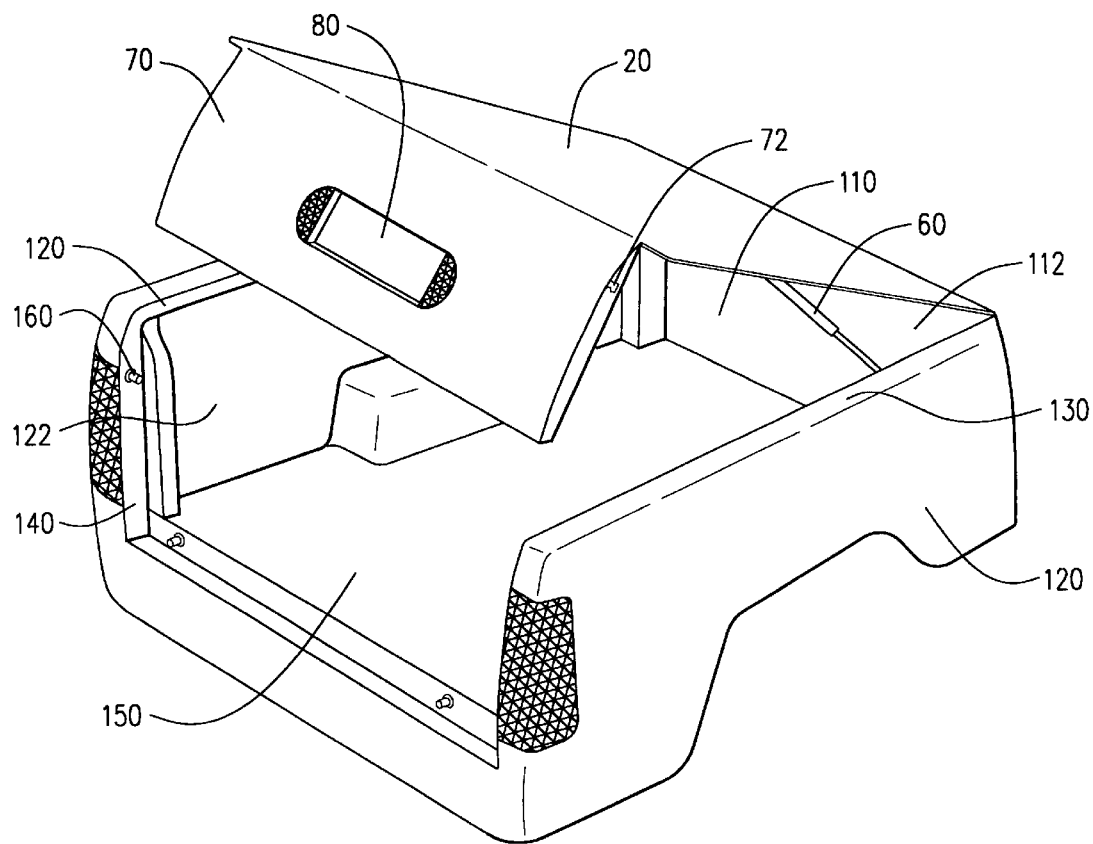
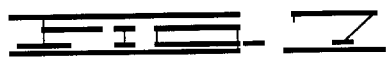
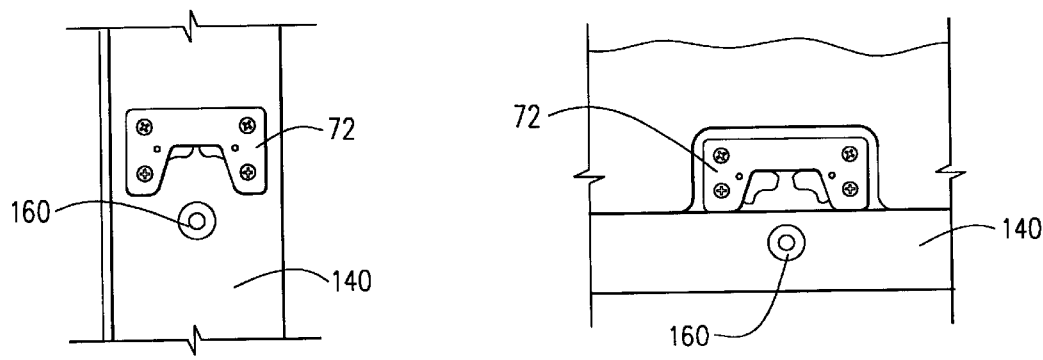
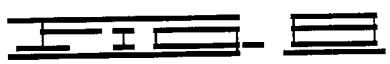   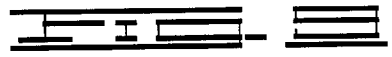

TRUCK BED TRUNK COVER

CROSS REFERENCE TO RELATED APPLICATIONS

This patent application is a Continuation-in-Part Application of patent application Ser. No. 10/143,658, filed on May 10, 2002, entitled "Pickup truck bed trunk".

I. BACKGROUND OF THE INVENTION

1. Field of Invention

The present invention relates to a trunk lid cover for the bed of a pickup, pivotally attaching to the pickup bed near the cab with piston lifters attaching the cover to the sides of the pickup to apply force pushing the cover upwards when lifted, the cover extending to the tailgate section of the pickup bed, replacing the tailgate. The cover engages the tailgate closure mechanism on the pickup bed to form a secure closure, with the vertical portion of the cover including a hinged license plate attachment under which a keyed or coded security lock is located, with running lights and accent lights which integrate with the electrical system of the pickup.

2. Description of Prior Art

The following United States patents were discovered and are disclosed within this application for utility patent. All relate to pickup bed storage devices, some incorporated within the pickup bed and others modifying the pickup bed. Most recently, U.S. Pat. No. 6,299,232 to Davis discloses a removable vehicle bed cover attaching to the upper rails of a pickup bed, covering the top of the pickup bed with a hinged panel and a fixed panel. This patent is distinguished from the present invention in that it merely covers the top opening of the pickup bed and does not enclose and conform to the entire pickup bed nor does it provide a complete and self contained enclosure in and of itself.

U.S. Pat. No. 6,174,012 to Saffold discloses a removable storage trunk for trucks, the device forming basically a five sided device attached to and inserted at the rear portion of the pickup bed, with the pickup tailgate serving as the closure for the enclosure, with a weather seal applied at a front surface of the device engaging the inside of the tailgate of the truck. This invention is distinguished from the present invention as the present invention requires the removal of the pickup tailgate to install the present invention, the present invention also providing a complete and self contained enclosure in and of itself.

Likewise, U.S. Pat. No. 5,564,768 to Saffold discloses a portable trunk lid, primarily for a Jeep Wrangle, but also adapted for other vehicle having open bed compartments, the device having a top wall and a front wall, with the top wall having partial side walls engaging the sides of the compartment to which they are applied. Again it is distinguished from the present invention as it does not provide a complete and self contained enclosure in and of itself.

In U.S. Pat. No. 6,102,474 to Daley, a pickup load body is disclosed apparently replacing and being integrated into the side panels of a conventional pickup bed, providing multiple tool storage compartments within the sides of the pickup bed, while leaving the inner compartment of the pickup bed open and unoccupied. The device discloses the lids of the storage compartments having an upper hinged lid which serves as the outer side panel of the pickup bed. This is distinguishable from the present invention, the present invention inserting completely within the bed of the pickup, installing and uninstalling without requiring modification of the standard pickup bed.

A storage compartment located between the pickup cab and pickup bed having a hinged lid accessed from the side of the pickup is disclosed in U.S. Pat. No. D366,448 to Ney, appearing to mount directly to the frame of the pickup, forming a complete and self contained enclosure, but it does not fit within a pickup bed without modification to the pickup bed and chassis. If this device was removed, there would be a space between the cab and the pickup bed.

A storage box with a sliding cover sliding side to side is disclosed in U.S. Pat. No. 4,993,771 to Ingerson, but its primary purpose is to provide the enclosure without interfering with a fifth wheel hitch and trailer attached to the bed of the pickup. This invention is distinguished from the current invention in that the current invention cannot be used with a fifth wheel trailer or hitch, since the current invention completely fills the entire pickup bed, which would not allow access to any fifth wheel trailer or hitch.

II. SUMMARY OF THE INVENTION

The primary objective of the invention is to provide a trunk lid cover which attaches to a pickup truck bed at the cab end of the pickup bed, similar to the tonneau cover currently on the market for pickup beds, with the exception of this cover not only covering the pickup bed along the top rails of the pickup bed, but also replacing the tailgate of the pickup, with the ability to adapt to the existing closure means of the pickup tailgate to close the trunk lid cover securely over the pickup bed.

A second aspect of the current cover is to provide a secure locking means, either through a keyed lock or an electronic keypad lock, hidden beneath the automobile tag, allowing for security in the contents stowed within the pickup bed.

A third objective of the invention is to provide the device in an aesthetic embodiment having the appearance of the trunk of a sedan on a pickup with the various utility aspects of the trunk lid cover mentioned above, the trunk lid cover having a horizontal portion engaging the upper side rails of the pickup bed and a vertical portion, smoothly attached to the horizontal portion, engaging the tailgate area of the pickup bed, with a weather-sealed perimeter to deter weather intrusion into the pickup bed.

III. DESCRIPTION OF THE DRAWINGS

The following drawings are submitted with this utility patent application.

FIG. 7 is the same perspective as FIG. 3, with the trunk lid cover in a raised position.

FIG. 8 is a side view of one embodiment of the trunk lid cover closure means.

FIG. 9 is a side view of another embodiment of the trunk lid cover closure means.

IV. DESCRIPTION OF THE PREFERRED EMBODIMENT

Figure 1:
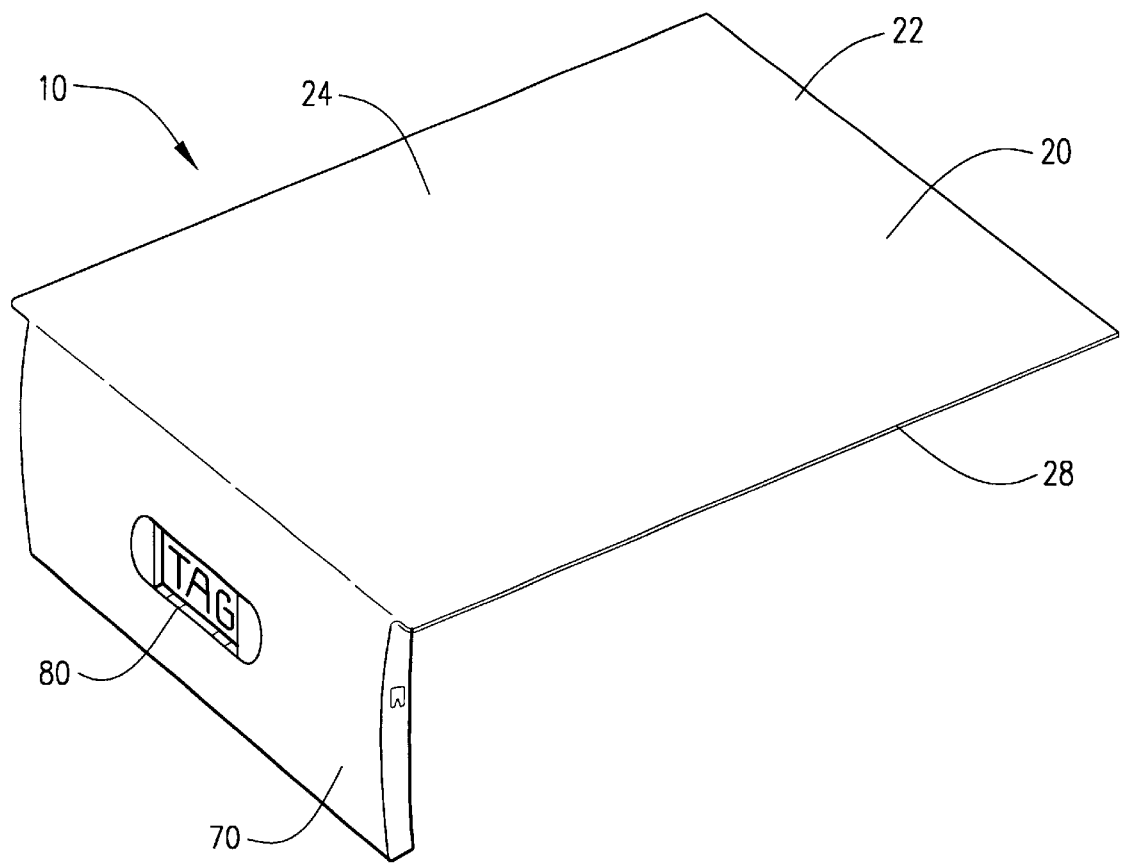
FIG. 1 is an upper view of the trunk lid cover.
Figure 2:
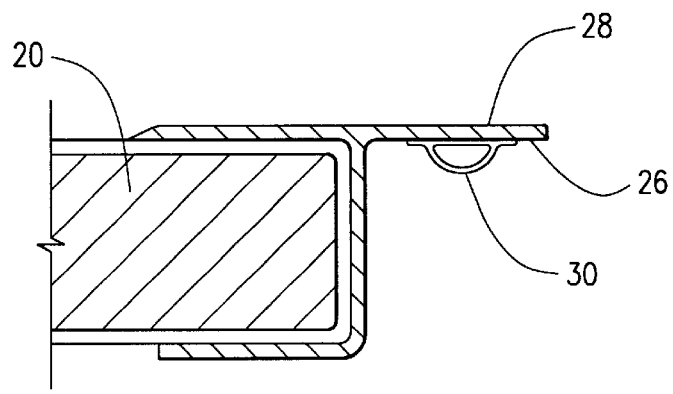
FIG. 2 is a side cross section of the side of the trunk lid cover, including the weather-strip seal.

The invention as shown in FIGS. 1–13 of the drawings is a pickup bed trunk lid cover 10 for installation and use in the bed of a pickup to secure and cover items placed in the pickup bed, and also to provide enhanced aerodynamic quality to the pickup bed by covering the pickup bed enhancing air flow over the pickup. This trunk lid cover 10 is intended to attach to a pickup bed 100, shown in FIGS. 3, 4, 7, 11, 12 and 13 of the drawings, provided that such pickup bed 100 has a cab end portion 110 having an inner surface 112, two side portions 120 having inner surfaces 122, upper bed rails 130 along the cab end portion 110 and the side portions 120, a bed floor 150, a drop-down tailgate section 140, and a tailgate closure mechanism 160 forming the pickup bed, regardless of dimension, adapted to fit within a full eight foot pickup bed, a six foot pickup bed, a four foot pickup bed or any length step-side pickup bed.

Figure 3:
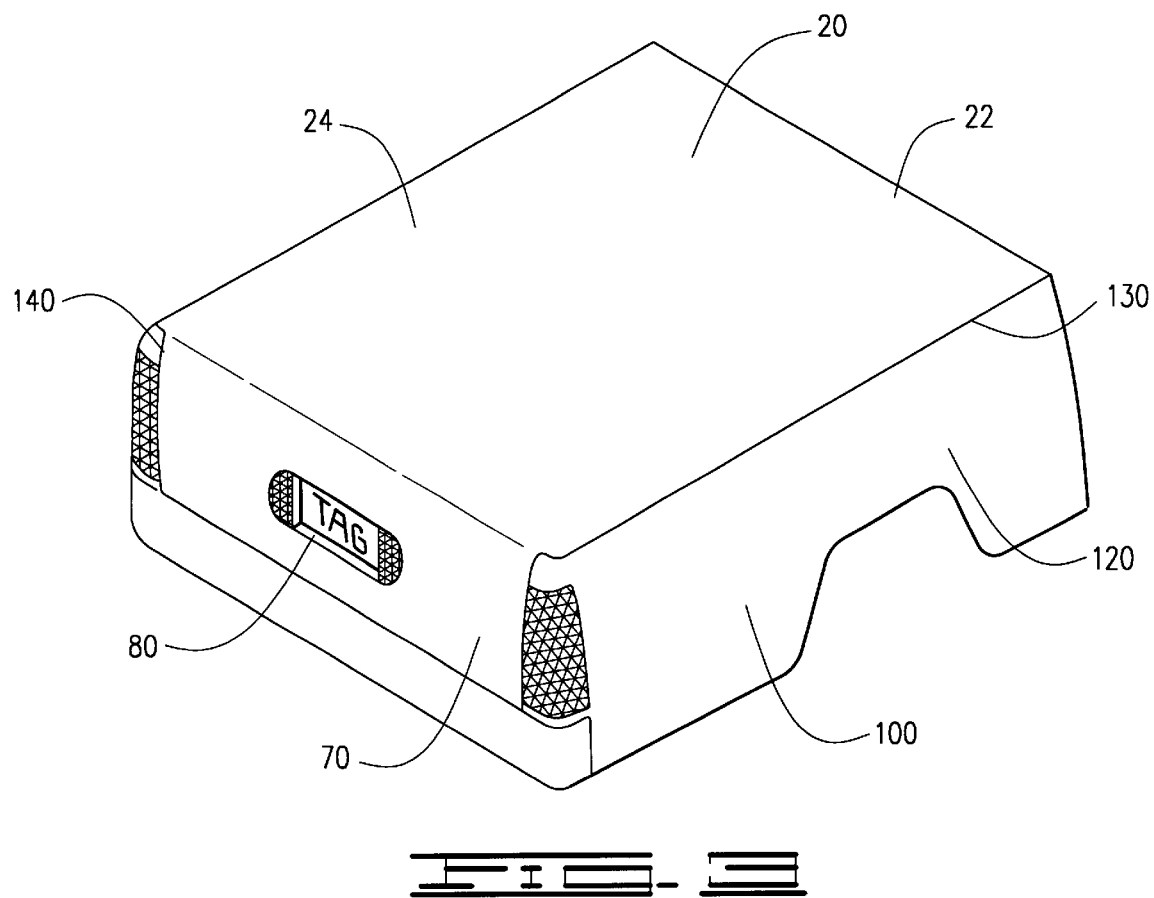
FIG. 3 is an upper cross-section of the trunk lid cover installed upon the bed of a pickup.
Figure 4:
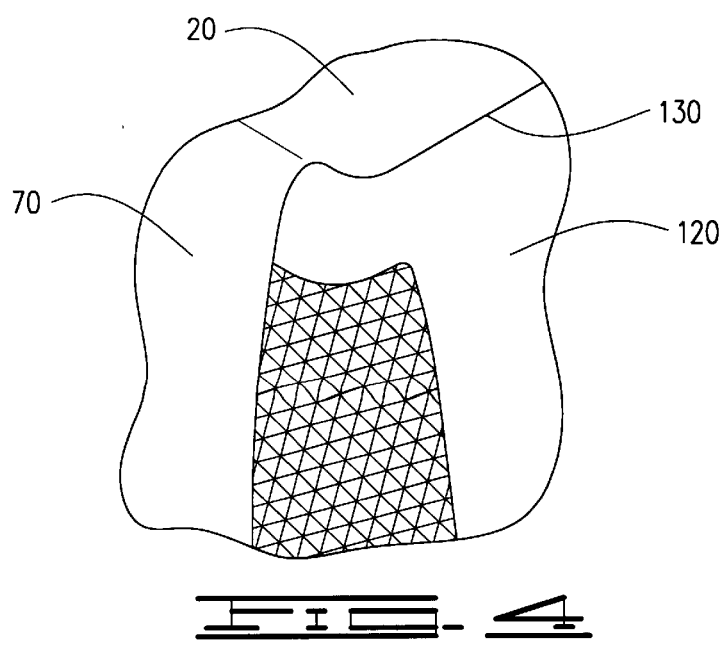
FIG. 4 is a close-up perspective of the trunk lid cover at the tailgate end of the pickup bed.
Figure 5:
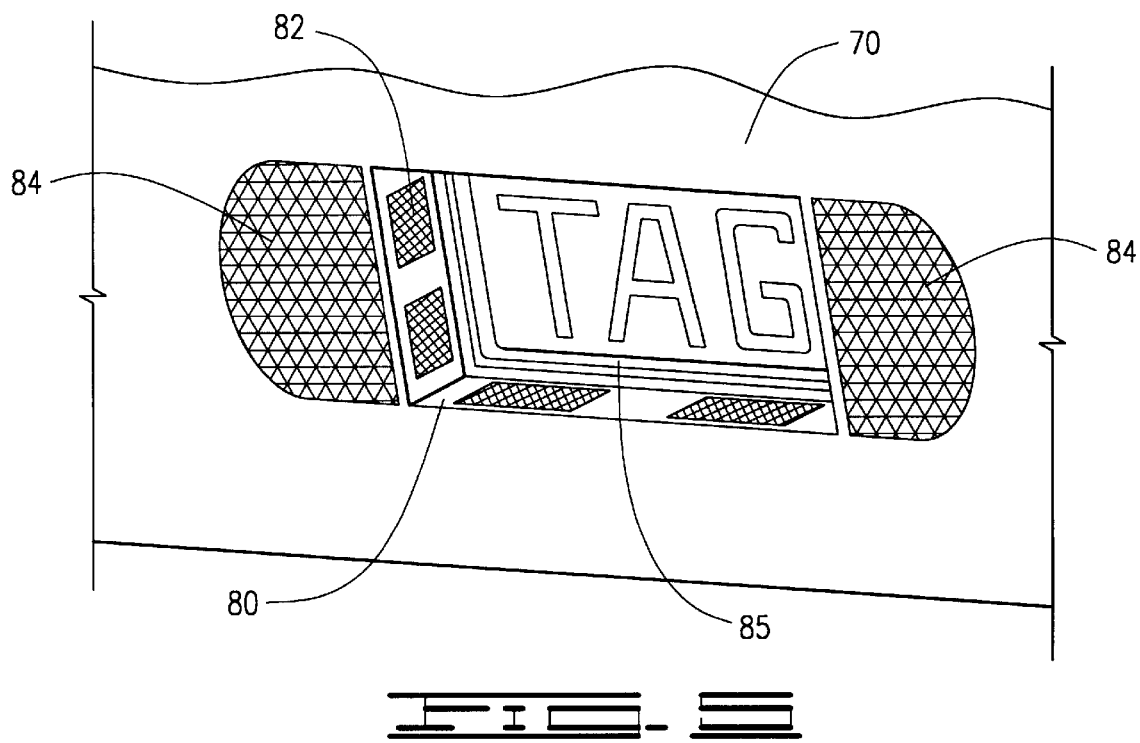
FIG. 5 is a view of the vertical portion of the trunk lid cover showing the flip-up tag, the running lights and the accent lights.

The trunk lid cover 10, shown in FIGS. 1, 3 and 7 of the drawings, comprises primarily a horizontal portion 20 resting on the upper bed rails 130 of the pickup bed 100 from which descends a vertical portion 70 extending within the drop-down tailgate section 140 of the pickup bed, having a similar configuration as a trunk of a sedan. The horizontal portion 20 attaches to the cab end 110 of the pickup bed by at least two hinges 40 and at least two piston lifters 60, shown in FIGS. 7 and 11–13 of the drawings, with a closure means 72, shown in FIGS. 7–10 of the drawings, located within the vertical portion 70, engaging the tailgate closure mechanism 160 of the drop-down tailgate section 140 of the pickup bed.

The horizontal portion 20 further includes a cab end segment 22, side segments 24, an underside 26, and an outer perimeter 28. The side segments 24 and cab end segment 22 on the underside 26 of the horizontal portion 20 include a flexible weather-strip seal 30, shown in FIG. 2 of the drawings, which is positioned between the trunk lid cover 10 and the upper bed rails 130 when the trunk lid cover 10 is closed. This weather-strip seal 30 is intended to prevent moisture from entering under the trunk lid cover 10 into the pickup bed 100.

Figure 12:
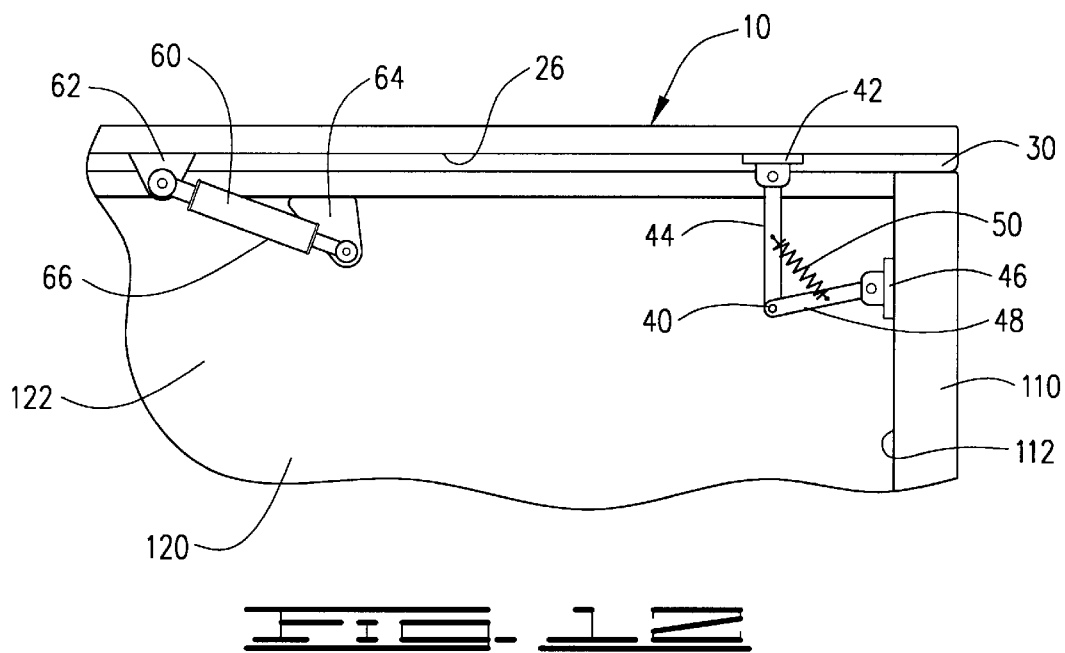
FIG. 12 is a side view of the piston lifter and hinge attached to the underside of the trunk lid cover and the cab end of the pickup bed with the trunk lid cover in a closed position.
Figure 13:
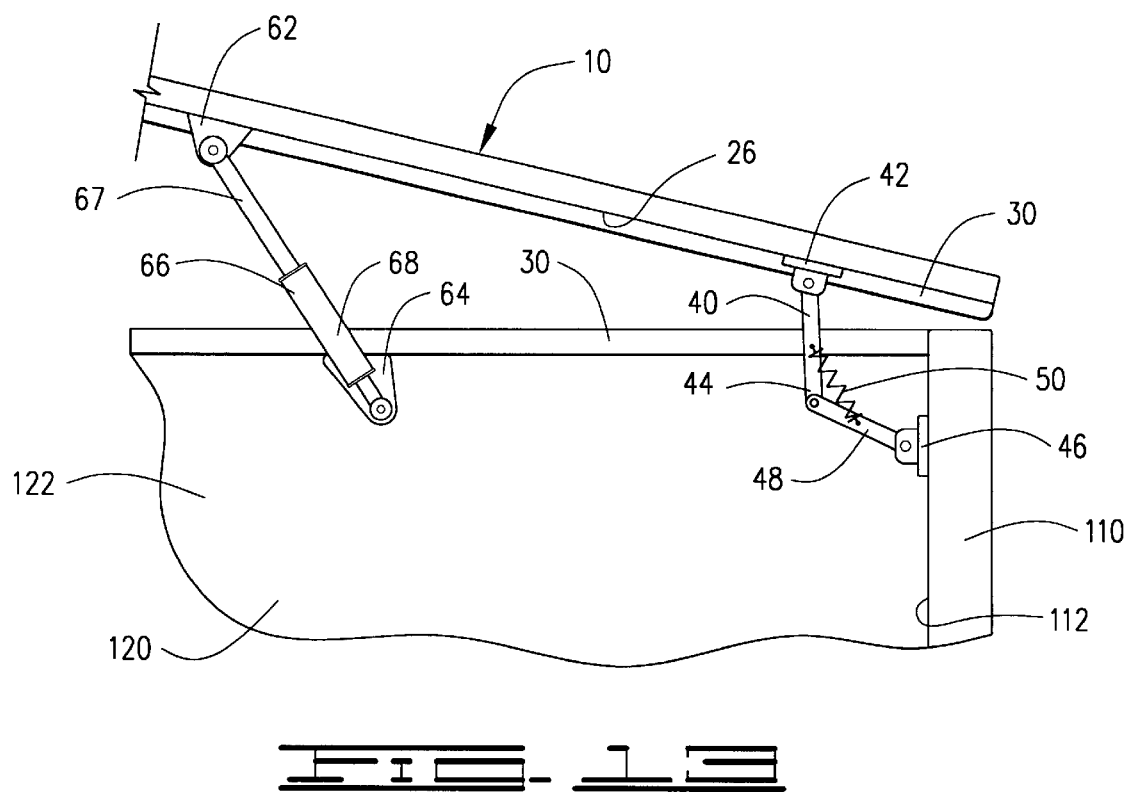
FIG. 13 is a side view of the piston lifter and hinge attached to the underside of the trunk lid cover and the cab end of the pickup bed with the trunk lid cover in an open position.

The each of the two hinges 40, shown in FIGS. 12 and 13 of the drawings, most preferably include a trunk lid cover mount 42 attached to the underside 26 of the cab end segment 22 of the horizontal portion 20 of the trunk lid cover, a cab end bed mount 46 attaching to the inner surface 112 of the cab end portion 110 of the pickup bed 100, an upper hinge arm 44 pivotally attached to the trunk lid cover mount 42, the upper hinge arm 44 further pivotally connecting to a lower hinge arm 48, such lower hinge arm 48, in turn, pivotally connected to the cab end bed mount 46, with a spring 50 attaching between the upper hinge arm 44 and lower hinge arm 48 to provide tension within the hinge 40.

Each of the piston lifters 60, shown in FIGS. 7 and 11–13 of the drawings, most preferably comprises a trunk lid cover base 62 attached to the underside 26 of each side segment 24 of the horizontal portion 20, a side bed base 64 attaching to the inner surface 122 of each side portion 120 of the pickup bed 100, and a pressurized piston lifter 66 including a shaft 67 and a piston cylinder 68, pivotally mounted between the trunk lid cover base 62 and the side bed base 64, providing lift to the trunk lid cover 10 when the trunk lid cover is raised.

Figure 10:
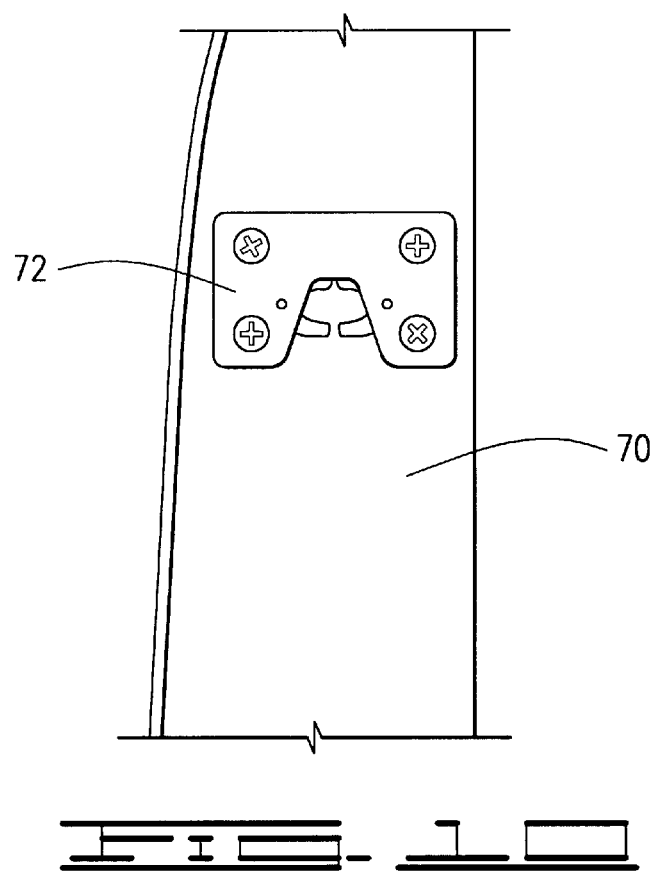
FIG. 10 is a partial side view of the vertical portion of the trunk lid cover.
Figure 11:
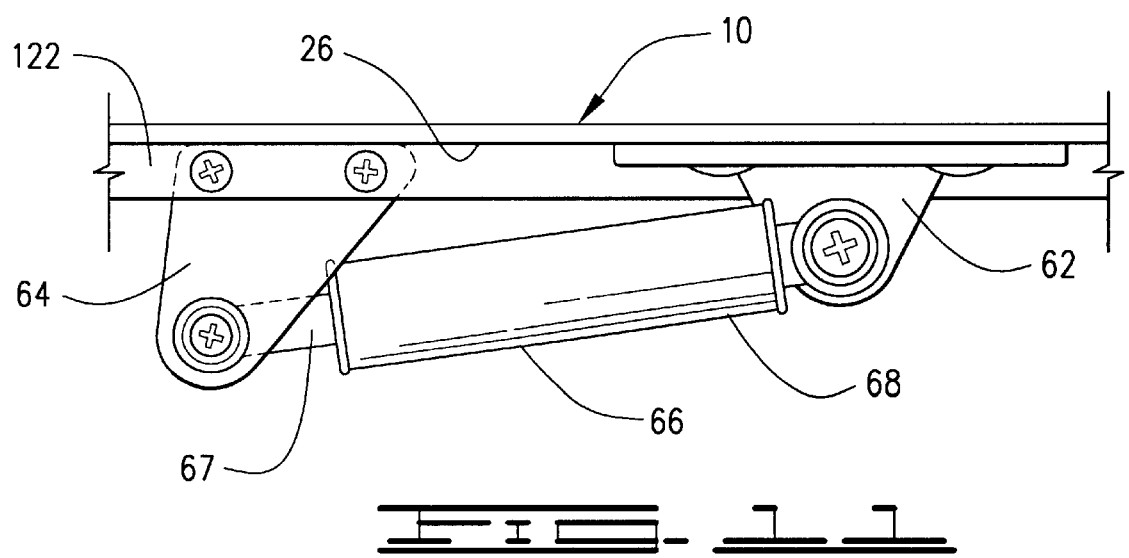
FIG. 11 is a side view of the piston lifter attached to the side of the pickup and the underside of the trunk lid cover.

The vertical portion 70 of the trunk lid cover descends from the horizontal portion 20 at a near ninety degree angle, and is situated to fit securely within the drop down tailgate section 140 of the pickup bed. This vertical portion 70 further incorporates the closure means 72, shown in FIGS. 7–10 of the drawings, attaching to the tailgate closure mechanism 160 provided within the drop-down tailgate section 140 which normally attaches the tailgate to the drop-down tailgate section 140, the tailgate being removed when the trunk lid cover 10 is applied to the pickup bed 100. Two different embodiments of this closure means 72 are shown in FIGS. 8–10 of the drawings.

Figure 6:
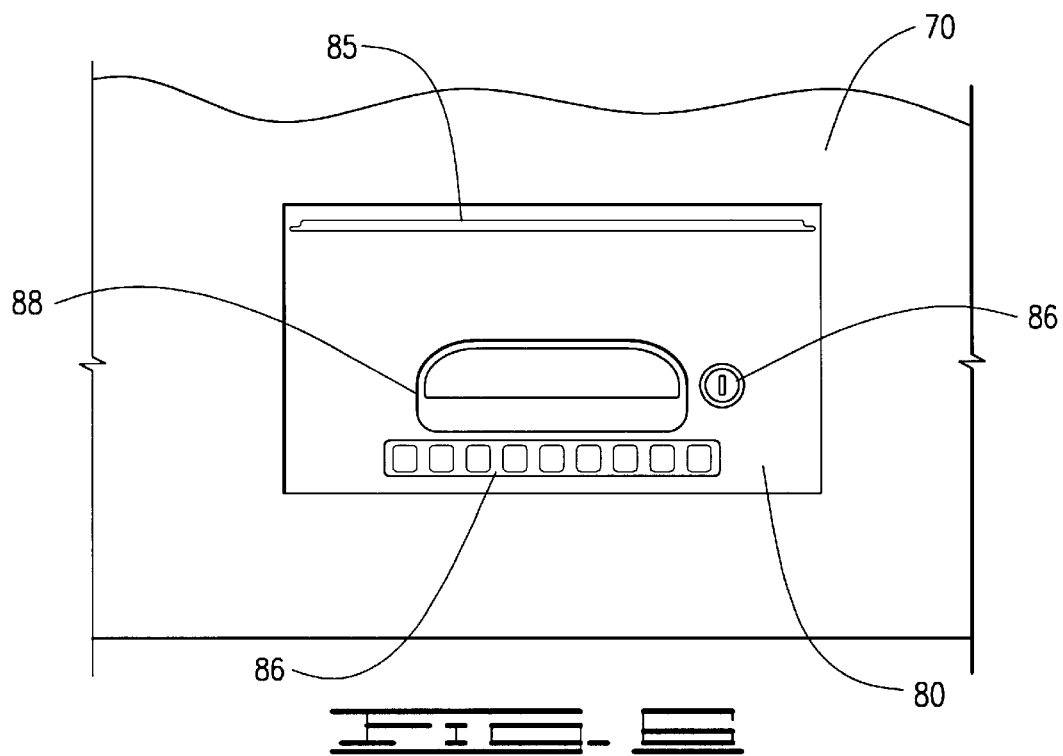
FIG. 6 is an end view of the vertical portion of the trunk lid cover showing the handle and the locking means under the elevated tag.

The vertical portion 70 of the trunk lid cover 10 further includes an inset license tag display 80, shown in FIGS. 1, 3, and 5–7 of the drawings, with accent lights 82 and running lights 74 illuminated within the license tag display 80, the accent lights 82 and running lights 84 incorporating with the electrical system available on the pickup. The license tag display 80 includes a hinged license plate bracket 85 which may be elevated to expose a locking closure means 86, shown in FIG. 6 of the drawings, and a lifting handle 88 within the inset license tag display 80. The locking closure means 86 may be a keypad or a keyed lock, as shown in FIG. 6 of the drawings. Access to the locking closure means 86 is achieved by raising the license tag bracket 85, depicted in FIG. 6 of the drawings. Once the locking closure means 86 has been unlocked, the trunk lid cover 10 is lifted by the lifting handle 88, raising the trunk lid cover 10 to gain access to the pickup bed, the hinges 40 and the piston lifters 60 providing assistance in the raising process. Closing the trunk bed cover 10 engages the locking closure means 86 within the vertical portion 70 of the trunk lid cover within the drop-down tailgate section 140, the locking closure means 86 engaging the tailgate closure mechanism 160.

While the invention has been particularly shown and described with reference to a preferred embodiment thereof, it will be understood by those skilled in the art that changes in form and detail may be made therein without departing from the spirit and scope of the invention.

What is claimed is:

1. A pickup bed trunk lid cover adapted to a pickup bed having a cab end portion with an inner surface, two side portions having inner surfaces, upper bed rails along the cab end portion and the side portions, a bed floor, and a drop-down tailgate section including a tailgate closure mechanism, the trunk lid cover comprising:

a horizontal portion resting on the upper side rails of the pickup bed attached to the cab end of the pickup bed by at least two hinges and at least two piston lifters;

a vertical portion descending from the horizontal portion extending entirely within the drop-down tailgate section of the pickup bed, the vertical portion including a closure means engaging the tailgate closure mechanism of the drop down tailgate section.

2. The trunk lid cover, as disclosed in claim 1, further comprising:

the horizontal portion further defining a cab end segment, two side segments, an underside, and an outer perimeter, the side segments and cab end segment on the underside of the horizontal portion having attached a flexible weather-strip seal positioned between the trunk lid cover and the upper bed rails;

the vertical portion further including the closure means attaching to the tailgate closure mechanism provided within the drop-down tailgate opening;

each hinge comprising a trunk lid cover mount attached to the underside of the cab end segment of the horizontal portion of the trunk lid cover, a cab end bed mount attaching to the inner surface of the cab end portion of the pickup bed, an upper hinge arm pivotally attached to the trunk lid cover mount, the upper hinge arm further pivotally connecting to a lower hinge arm, such lower hinge arm, in turn, pivotally connected to the cab end bed mount, with a spring attaching between the upper hinge arm and lower hinge arm to provide tension within the hinge; and each piston lifter comprising a trunk lid cover base attached to the underside of each side segment of the horizontal portion of the trunk lid cover, a side bed base attaching to the inner surface of each side portion of the pickup bed, and a pressurized piston lifter including a shaft and a piston cylinder, pivotally mounted between the trunk lid cover base and the side bed base, providing lift to the trunk lid cover when the trunk lid cover is raised.

3. The trunk lid cover as disclosed in claim 1, wherein the vertical portion of the trunk lid cover includes:

an inset license tag display with accent lights and running lights illuminated within the license tag display, the license tag display further including a hinged license plate bracket, a locking closure means and a lifting handle with access to the locking closure means achieved by raising the hinged license plate bracket, exposing the locking closure means and the lifting handle.

4. A pickup bed trunk lid cover adapted to a pickup bed having a cab end portion with an inner surface, two side portions having inner surfaces, upper bed rails along the cab end portion and the side portions, a bed floor, and a drop-down tailgate section including a tailgate closure mechanism, the trunk lid cover comprising:

a horizontal portion further defining a cab end segment, two side segments, an underside, and an outer perimeter, the side segments and cab end segment on the underside of the horizontal portion having attached a flexible weather-strip seal positioned between the trunk lid cover and the upper bed rails;

a vertical portion descending from the horizontal portion extending entirely within the drop-down tailgate section of the pickup bed, said vertical portion further including a closure means attaching to the tailgate closure mechanism provided within the drop-down tailgate opening;

at least two hinges attaching the cab end segment of the pickup bed to the underside of the trunk lid cover, said hinges further comprising a trunk lid cover mount attached to the underside of the cab end segment of the horizontal portion of the trunk lid cover, a cab end bed mount attaching to the inner surface of the cab end portion of the pickup bed, an upper hinge arm pivotally attached to the trunk lid cover mount, said upper hinge arm further pivotally connecting to a lower hinge arm, said lower hinge arm, in turn, pivotally connected to the cab end bed mount, with a spring attaching between the upper hinge arm and lower hinge arm to provide tension within the hinge; and at least two piston lifters attaching the side portions of the pickup bed to the underside of the side segments of the trunk lid cover, said piston lifters further comprising a trunk lid cover base attached to the underside of each side segment of the horizontal portion of the trunk lid cover, a side bed base attaching to the inner surface of each side portion of the pickup bed, and a pressurized piston lifter including a shaft and a piston cylinder, pivotally mounted between the trunk lid cover base and the side bed base, providing lift to the trunk lid cover when the trunk lid cover is raised.

5. The trunk lid cover as disclosed in claim 4, wherein the vertical portion of the trunk lid cover also includes:

an inset license tag display with accent lights and running lights illuminated within the license tag display, the license tag display further including a hinged license plate bracket, a locking closure means and a lifting handle with access to the locking closure means achieved by raising the hinged license plate bracket, exposing the locking closure means and the lifting handle.

\* \* \* \* \*